(12) United States Patent
Watanabe et al.

(10) Patent No.: US 6,605,361 B2
(45) Date of Patent: Aug. 12, 2003

(54) COATING COMPOSITION FOR LENSES AND METHOD FOR PRODUCING THE SAME

(75) Inventors: Jun Watanabe, Tokyo (JP); Takanobu Itoh, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/965,867

(22) Filed: Oct. 1, 2001

(65) Prior Publication Data

US 2002/0064665 A1 May 30, 2002

(30) Foreign Application Priority Data

Sep. 29, 2000 (JP) .......................................... 2000-300143

(51) Int. Cl.[7] .............................. B32B 9/04; B05D 3/02; B05D 5/06
(52) U.S. Cl. ........................ 428/447; 428/446; 427/387; 427/162; 427/164
(58) Field of Search ................. 428/446, 447, 428/448; 427/387, 162, 164; 528/10, 12, 14, 16, 17, 18, 21, 33, 39, 43

(56) References Cited

U.S. PATENT DOCUMENTS

| | | | | |
|---|---|---|---|---|
| 5,116,637 A | * | 5/1992 | Baney et al. ................ | 427/340 |
| 5,135,981 A | * | 8/1992 | Matsumaru et al. ......... | 524/547 |
| 6,057,039 A | * | 5/2000 | Takeshita et al. ........... | 428/447 |
| 6,296,943 B1 | * | 10/2001 | Watanabe et al. ........... | 428/447 |
| 6,485,138 B1 | * | 11/2002 | Kubota et al. ................ | 347/96 |
| 2002/0034613 A1 | * | 3/2002 | Liu et al. .................... | 428/195 |

FOREIGN PATENT DOCUMENTS

| | | |
|---|---|---|
| JP | 60-11727 | 3/1985 |
| JP | 61-33868 | 8/1986 |
| JP | 3-217230 | 9/1991 |
| JP | 6-25603 | 2/1994 |
| JP | 8-113760 | 5/1996 |
| JP | 9-21901 | 1/1997 |
| JP | 10-306258 | 11/1998 |

* cited by examiner

*Primary Examiner*—Robert Dawson
*Assistant Examiner*—Michael J Feely
(74) *Attorney, Agent, or Firm*—Morrison & Foerster LLP

(57) ABSTRACT

A coating composition that can be applied to a lens, a method of making the coating composition, and a coated lens comprising a cured coating composition of the invention are disclosed. The coating composition is produced by providing a mixture comprising metal oxide colloid particles and an organosilicon compound, and adding an acetylacetonate metal salt and an aliphatic amine to the mixture.

5 Claims, No Drawings

COATING COMPOSITION FOR LENSES AND METHOD FOR PRODUCING THE SAME

FIELD OF THE INVENTION

The present invention relates to a coating composition for lenses, a method of producing the same, and a coated lens.

BACKGROUND OF THE INVENTION

There is a present need to manufacture plastic articles that are scratch resistant and have an aesthetic appearance. Scratch resistance is typically provided by applying a coating composition to a surface of the plastic article, followed by curing the coating composition.

Curing catalysts are typically used in the coating composition to facilitate the curing process. For example, Japanese Patent Publication No. 33868/1986 discloses amine compounds, and Japanese Patent Publication No. 11727/1985 discloses aluminum or iron acetylacetonates curing catalysts.

However, the acetylacetonates can be problematic, in that they tend to reduce the shelf life of coating compositions. Because coating compositions can be expensive, an improvement of their storage stability, that is, an increase of their shelf life is desired. Also, coating compositions with improved storage stability are desired because the quality of the coated lens can be related to the shelf life of the coating composition. Coating compositions with a relatively long shelf life tend provide a relatively strong adhesive bond between the lens and the cured coating. The present invention overcomes prior coating compositions by providing a coating composition for lenses with a relatively long shelf life.

SUMMARY OF THE INVENTION

One embodiment of this invention is a method for producing a coating composition for a lens comprising providing a mixture comprising metal oxide colloid particles and an organosilicon compound; and adding an acetylacetonate metal salt and an aliphatic amine to the mixture. The organosilicon compound could be selected from compounds of the general formula (I):

$$(R^1)_a(R^3)_b Si(OR^2)_{4-(a+b)} \qquad (I)$$

wherein $R^1$ and $R^3$ are independently a hydrocarbon group having from 1 to 10 carbon atoms and optionally having a functional group; $R^2$ is selected from an alkyl group having from 1 to 8 carbon atoms, an aryl group having from 6 to 10 carbon atoms, an alkyl group having from 7 to 10 carbon atoms that includes an aryl group, an acyl group having from 1 to 8 carbon atoms or the combinations thereof; and a and b are 0 or 1; and $(OR^2)$'s may be the same or different, or compounds of the general formula (II):

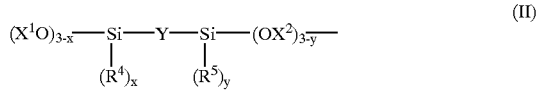

$$(II)$$

wherein $R^4$ and $R^5$ are a hydrocarbon group having from 1 to 5 carbon atoms and optionally having a functional group; $X^1$ and $X^2$ independently comprise a group selected from an alkyl group having from 1 to 4 carbon atoms, an acyl group having from 1 to 4 carbon atoms, the hydrolyzate products thereof, or the combinations thereof; Y represents a hydrocarbon group having from 1 to 20 carbon atoms; and x and y is 0 or 1.

In a preferred embodiment, the coating composition comprises between 1 and 500 parts by weight of the metal oxide colloid particles, and between 0.001 and 10 parts by weight of the aliphatic amine, relative to 100 parts by weight of the organosilicon compound. In another preferred embodiment, the metal oxide colloid particles are selected from aluminum oxide, iron oxide, tin oxide, zirconium oxide, silicon oxide, titanium oxide, tungsten oxide, antimony oxide, or their composite oxides. In yet another preferred embodiment, the aliphatic amine and the acetylacetonate metal salt are added to the mixture after a portion of the metal particles and the organosilicon compound react.

Another embodiment of this invention is a coating composition for lenses produced by the process comprising providing a mixture comprising metal oxide colloid particles and an organosilicon compound; and adding an acetylacetonate metal salt and an aliphatic amine to the mixture.

Another embodiment of this invention is a method for producing a coated lens, comprising producing a coating composition, applying the coating composition to a surface of a lens, and curing the coating composition; wherein the coating composition is produced by providing a mixture comprising metal oxide colloid particles and an organosilicon compound, and adding an acetylacetonate metal salt and an aliphatic amine to the mixture.

Yet another embodiment of this invention is a coated lens comprising a lens; and a cured coating disposed on a surface of the lens, wherein the cured coating results from curing a coating composition applied to the lens, the coating composition produced by the process comprising providing a mixture comprising metal oxide colloid particles and an organosilicon compound; and adding an acetylacetonate metal salt and an aliphatic amine to the mixture.

Still another embodiment is a coating composition for lenses comprising a mixture, the mixture comprising metal oxide colloid particles, an organosilicon compound, an acetylacetonate metal salt and an aliphatic amine, or a product of a reaction of the mixture.

DETAILED DESCRIPTION OF THE INVENTION

The invention is directed to a coating composition for lenses. The coating composition with a relatively high shelf life comprises adding an acetylacetonate metal salt that serves as a curing agent and an aliphatic amine to a mixture comprising metal oxide colloid particles and an organosilicon compound.

The metal oxide colloid particles are not specifically limited. Examples of the metal oxide colloid particles are particles, desirably fine particles, of single metal oxides such as aluminum oxide, titanium oxide, antimony oxide, tin oxide, zirconium oxide, silicon oxide, cerium oxide, iron oxide, etc., disclosed in Japanese Patent Laid-Open No. 113760/1996. Japanese Patent Laid-Open No. 217230/1991 discloses titanium oxide, cerium oxide and silicon oxide. Particles of metal composite oxides, for example, particles of tin oxide-zirconium oxide-tungsten oxide disclosed in Japanese Patent Laid-Open No. 25603/1994, and tin oxide-tungsten oxide disclosed in, titanium oxide-zirconium oxide-tin oxide disclosed in Japanese Patent Laid-Open No. 306258/1998, titanium oxide-zirconium oxide-silicon oxide, and those of a composite, stannic oxide-zirconium oxide-tungsten oxide disclosed in Japanese Patent Laid-Open No. 21901/1997, etc. The mean particle size of the metal oxide colloid particles may fall generally between 1 and 500 nm. One or a combination of different metal oxide colloid particles may be used.

The amount of metal oxide particles in the composition can be between 1 and 500 parts by weight, preferably between 10 and 200 parts by weight, and more preferably between 50 and 150 parts by weight, relative to 100 parts by weight of the organosilicon compound therein.

The organosilicon compound is selected from compounds of the general formula (I):

$$(R^1)_a(R^3)_b Si(OR^2)_{4-(a+b)} \quad (I)$$

wherein $R^1$ and $R^3$ are independently a hydrocarbon group selected from an alkyl group having from 1 to 10 carbon atoms, an alkenyl group having from 2 to 10 carbon atoms, an aryl group having from 6 to 10 carbon atoms, an alkyl group having from 7 to 10 carbon atoms that includes an aryl group, or an acyl group having from 1 to 8 carbon atoms; $R^2$ is selected from an alkyl group having from 1 to 8 carbon atoms, an aryl group having from 6 to 10 carbon atoms, a alkyl group having from 7 to 10 carbon atoms including an aryl group, or an acyl group having from 1 to 8 carbon atoms; and a and b are 0 or 1; and $(OR^2)$'s may be the same or different, or compounds of the general formula (II):

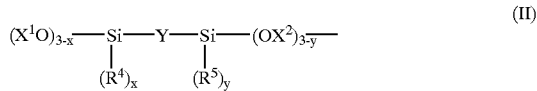

$$(X^1O)_{3-x}\text{—Si—Y—Si—}(OX^2)_{3-y} \quad (II)$$
$$\quad\quad | \quad\quad | $$
$$\quad (R^4)_x \quad (R^5)_y$$

wherein $R^4$ and $R^5$ are a hydrocarbon group having from 1 to 5 carbon atoms; $X^1$ and $X^2$ independently comprise a group selected from an alkyl group having from 1 to 4 carbon atoms, an acyl group having from 1 to 4 carbon atoms, the hydrolyzate products thereof, or the mixtures thereof; Y represents a hydrocarbon group having from 1 to 20 carbon atoms; and x and y is 0 or 1.

In formula (I), if $R^1$ and $R^3$ are alkyl and/or alkenyl groups, these groups can independently be linear, branched or cyclic. Examples of the alkyl group having from 1 to 10 carbon atoms are methyl, ethyl, n-propyl, isopropyl, n-butyl, isobutyl, sec-butyl, tert-butyl, pentyl, hexyl, octyl, cyclopentyl, cyclohexyl, etc. Examples of the alkenyl group include vinyl, allyl, butenyl, hexenyl, octenyl, etc. Examples of the aryl group include phenyl, tolyl, xylyl, naphthyl, etc. Examples of the alkyl group having an aryl group include benzyl, phenethyl, naphthylmethyl, etc. All of these stated hydrocarbon groups may have an attached functional group moiety. The functional group includes a halogen atom, a glycidoxy group, an epoxy group, an amino group, a cyano group, a mercapto group, a (meth)acryloxy group, etc. Examples of the hydrocarbon group having from 1 to 10 carbon atoms and having such a functional group are a glycidoxymethyl group, an α-glycidoxyethyl group, a β-glycidoxyethyl group, an α-glycidoxypropyl group, a β-glycidoxypropyl group, a γ-glycidoxypropyl group, an α-glycidoxybutyl group, a β-glycidoxybutyl group, a γ-glycidoxybutyl group, a δ-glycidoxybutyl group, a (3,4-epoxycyclohexyl)methyl group, a β-(3,4-epoxycyclohexyl) ethyl group, a γ-(3,4-epoxycyclohexyl)propyl group, a δ-(3,4-epoxycyclohexyl)butyl group, a chloromethyl group, a γ-chloropropyl group, a 3,3,3-trifluoropropyl group, a γ-methacryloxypropyl group, a γ-acryloxypropyl group, a γ-mercaptopropyl group, a β-cyanoethyl group, an N-(β-aminoethyl)-γ-aminopropyl group, a γ-aminopropyl group, etc.

The alkyl group having from 1 to 8 carbon atoms for $R^2$ may be linear, branched or cyclic. Examples of the alkyl group include methyl, ethyl, n-propyl, isopropyl, n-butyl, isobutyl, sec-butyl, tert-butyl, pentyl, hexyl, cyclopentyl, cyclohexyl, etc. Examples of the aryl group for $R^2$ include phenyl, tolyl, xylyl, etc.; and examples of the alkyl group having an aryl moiety for $R^2$ include benzyl, phenethyl, etc. The acyl group for $R^2$ includes an acetyl group, etc. The subscripts a and b can be 0 or 1; and the $(OR^2)$'s may be the same or different.

Examples of the compound of the general formula (I) are methyl silicate, ethyl silicate, n-propyl silicate, isopropyl silicate, n-butyl silicate, sec-butyl silicate, tert-butyl silicate, tetraacetoxysilane, methyltrimethoxysilane, methyltripropoxysilane, methyltriacetoxysilane, methyltributoxysilane, methyltriamyloxysilane, methyltriphenoxysilane, methyltribenzyloxysilane, methyltriphenethyloxysilane, glycidoxymethyltriethoxysilane, glycidoxymethyltrimethoxysilane, α-glycidoxyethyltrimethoxysilane, α-glycidoxyethyltriethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltriphenoxysilane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl) methyltriethoxysilane, (3,4-epoxycyclohexyl) methytrimethoxysilane, β-(3,4-epoxy cyclohexyl) ethyltriethoxysilane, β-(3,4-epoxycyclohexyl) ethyltrimethoxysilane, β-(3,4-epoxycyclohexyl) ethyltripropoxysilane, β-(3,4-epoxycyclohexyl) ethyltributoxysilane, β-(3,4-epoxycyclohexyl) ethyltriphenoxysilane, γ-(3,4-epoxycyclohexyl) propyltrimethoxysilane, γ-(3,4-epoxycyclohexyl) propyltriethoxysilane, δ-(3,4-epoxycyclohexyl) butyltrimethoxysilane, δ-(3,4-epoxycyclohexyl) butyltriethoxysilane, glycidoxymethyheth oyldimethoxysilane, glycidoxymethylmethyldiethoxysilane, α-gycidoxyethyhnethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, α-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane,
γ-glycidoxypropylphenyldimethoxysilane,
γ-glycidoxypropylphenyldiethoxysilane,
ethyltrimethoxysilane, ethyltriethoxysilane,
vinyltrimethoxysilane, vinyltriacetoxysilane,
vinyltriethoxysilane, phenyltrimethoxysilane,
phenyltriethoxysilane, phenyltriacetoxysilane,
γ-chloropropyltrimethoxysilane,
γ-chloropropyltriacetoxysilane, 3,3,3-trifluoropropyltrimethoxysilane,
γ-methacryloxypropyltrimethoxysilane,
γ-mercaptopropyltrimethoxysilane,
γ-mercaptopropyltriethoxysilane,
β-cyanoethyltriethoxysilane, chloromethyltrimethoxysilane,
chloromethyltriethoxysilane, N-(β-aminoethyl)-γ-aminopropyltrimethoxysilane, N-(β-aminoethyl)-γ-aminopropylmethyldimethoxysilane,
γ-aminopropylmethyldimethoxysilane, N-(β-aminoethyl)-γ-aminopropylmethyldiethoxysilane,
dimethyldimethoxysilane, phenylmethyldimethoxysilane,
dimethyldiethoxysilane, phenylmethyldiethoxysilane,
γ-chloropropylmethyldiethoxysilane,
γ-chloropropylmethyldimethoxysilane,
dimethyldiacetoxysilane,
γ-methacryloxypropylmethyldimethoxysilane,
γ-methacryloxypropylmethyldiethoxysilane,
γ-mercaptopropylmethyldimethoxysilane,
γ-mercaptopropylmethyldiethoxysilane,
methylvinyldimethoxysilane, methylvinyldiethoxysilane, etc.

In the general formula (II), the alkyl group having from 1 to 4 carbon atoms for $X^1$ and $X^2$ includes methyl, ethyl, n-propyl, isopropyl, n-butyl, isobutyl, sec-butyl, tert-butyl, etc.; and the acyl group having from 1 to 4 carbon atoms is preferably an acetyl group. These $X^1$ and $X^2$ may be the same or different. The hydrocarbon group for $R^4$ and $R^5$ includes an alkyl group having from 1 to 5 carbon atoms, and an alkenyl group having from 2 to 5 carbon atoms. These may be linear, branched or cyclic. Examples of the alkyl group are methyl, ethyl, n-propyl, isopropyl, n-butyl, sec-butyl, tert-butyl, pentyl, etc. Examples of the alkenyl group are vinyl, allyl, butenyl, etc. These hydrocarbon groups may have an attached functional group moiety. For the functional group and the functional group-having hydrocarbon group, referred to are the same as those mentioned above for $R^1$ and $R^3$ in the general formula (I). These $R^4$ and $R^5$ may be the same or different. Y is a hydrocarbon group having from 1 to 20 carbon atoms Preferred are an alkylene group or an alkylidene group, including, for example, methylene, ethylene, propylene, butylene, pentylene, hexylene, octylene, ethylidene, propylidene, etc. The subscripts x and y can be 0 or 1; the $(OX^1)$ groups can be the same or different, and the $(OX^2)$ groups can be the same or different.

Examples of the compound of the general formula (II) are methylenebis(methyldimethoxysilane), ethylenebis(ethyldimethoxysilane), propylenebis(ethyldiethoxysilane), butylenebis(methyldiethoxysilane), etc.

In the coating composition of the invention, the organosilicon compound can be selected from the compounds of the general formula (I) and (II), any combination thereof or their hydrolyzate products. The hydrolyzates may be prepared by adding an aqueous basic solution such as an aqueous solution of sodium hydroxide, ammonia or the like, or an aqueous acidic solution such as an aqueous solution of hydrochloric acid, acetic acid, citric acid or the like to a compound of the general formula (I) or (II).

In the coating composition of the invention, the acetylacetonate metal salt serves as a curing agent. The acetylacetonate metal salt can be a metal complex with the general formula:

$$M^1(CH_3COCHCOCH_3)_{n1}(OR^6)_{n2}$$

wherein $M^1$ represents Zn(II), Ti(IV), Co(II), Fe(II), Cr(III), Mn(II), V(III), V(IV), Ca(II), Co(III), Cu(II), Mg(II), or Ni(II); $R^6$ represents a hydrocarbon group having from 1 to 8 carbon atoms; n1+n2 is a number corresponding to the valence of M, n. is 2, 3 or 4, and n2 is 0, 1 or 2. $R^6$ is a hydrocarbon group having from 1 to 8 carbon atoms, the substituents in general formula (I).

Preferably, the amount of the acetylacetonate metal salt in the coating composition is between 0.001 and 50 parts by weight, and more preferably between 0.1 and 10 parts by weight, relative to 100 parts by weight of the organosilicon compound therein. If the amount of the metal salt is smaller than 0.001 part by weight, the curing of the coating composition can be insufficient. If the amount of the metal salt is larger than 50 parts by weight, the cured film can exhibit poor physical properties.

The use of an aliphatic amine (is believed to increase the shelf life of the coating composition. Although it is known that aliphatic amines can serve as a curing agent for coating compositions, it is not known that they can also serve to increase the shelf life of coating compositions. The aliphatic amine includes, for example, those of the following formula:

$$NR^7R^8R^9$$

wherein N is a nitrogen atom; and $R^7$, $R^8$ and $R^9$ are independently a hydrogen atom or an aliphatic group. Examples of some aliphatic amines it includes allylamine, diallylamine, i-propylamine, propylamine, butylamine, i-butylamine, t-butylamine, sec-butylamine, methylamine, ethylamine, diethylamine, dibutylamine, diisobutylamine, diisopropylamine, tri-n-octylamine, ethoxypropylamine, methoxypropylamine, etc.

Preferably, the amount of the aliphatic amine in the composition is between 0.001 and 10 parts by weight, more preferably, between 0.01 and 10 parts by weight, relative to 100 parts by weight of the organosilicon compound therein. If the amount of aliphatic amine in the composition is less than 0.001 part by weight, the storage stability of the coating composition exhibits little or no improvement. If the amount of aliphatic amine is greater than 10 parts by weight, the cured coating can exhibit poor physical properties.

The coating composition of the invention is prepared by providing a mixture comprising metal oxide colloid particles and one or more organosilicon compounds. The acetylacetonate metal salt and the aliphatic amine are then added to the mixture. It is especially preferred, after the metal oxide particles and the organosilicon compound have been mixed and hydrolyzed, the acetylacetonate metal salt and the aliphatic amine are added to the mixture. The method of making the coating composition provides a coating composition with a relatively high shelf life. Also, the invention provides a coating with a relatively strong adhesive bond to the lens, and the coated lenses are scratch resistant.

If desired, various organic solvents and surfactants may be added to the coating composition to improve the wettability of the composition applied to the lens and to improve the surface texture of the cured coating. Typically, a surface with a smooth texture is desired. Also, UV absorbents, antioxidants, light stabilizers and anti-aging agents can also be added to the coating composition. Desirably, these additive components should not have any negative influence on the properties of the coating composition or on the properties of the coating.

The lens of the invention includes, lenses made of plastics for example, methyl methacrylate homopolymers, copolymers of methyl methacrylate with at least one other monomers, diethylene glycol bisallylcarbonate homopolymers, copolymers of diethylene glycol bisallylcarbonate with at least one other monomer, sulfur-containing copolymers, halogen-containing copolymers, polycarbonates, polystyrenes, polyvinyl chlorides, unsaturated polyesters, polyethylene terephthalates, polyurethanes, polythiourethanes, etc.

The coated lens of the invention is produced by applying a coating composition to a surface of a lens, followed by curing the coating composition to form a cured coating thereon. The cured coating adheres to the lens without the lens being subjected to a physical or chemical pre-treatment. However, that is not to say that the lens to be coated may not be previously subjected to any conventional pretreatment to improve the film adhesive strength. Chemical treatments that can be used to pre-treat the lens include contacting with any of acids, alkalis and various organic solvents, washing with various detergents, or treating with primer resins. Physical pre-treatments that can be used include physical treatment with plasma, UV rays or the like, or sand blasting. The chemical and/or physical pre-treatments enhance the adhesive bond between the lens and the cured coating.

For applying the coating composition onto the surface of a lens any method known to those skilled in the art can be used, including but not limited to, dip coating, spin coating, or spraying. It is preferred, that the coating composition be applied by dip coating or spin coating. The applied coating composition is then cured by drying in hot air or by exposing the coated lens to a light source. Preferably, the applied coating is cured in hot air at 70° C. to about 200° C., and more preferably from about 90° C. to about 150° C. One of the light sources can include a light source that generates far-infrared radiation.

The invention is described in more detail with reference to the following Examples. The described examples are not intended to restrict the scope of the invention.

EXAMPLES

1. Production of Aqueous Methanol Sol

Example 1

An aqueous sol of stannic oxide was prepared through reaction of tin powder, aqueous hydrochloric acid and aqueous hydrogen peroxide. The specific gravity of the sol was about 1.420, the pH was about 0.40, and the viscosity was about 32 mPa·s. The $SnO_2$ content of the sol was about 33.0% by weight, and the HCl content was about 2.56% by weight. The particle size of the formed colloidal particles, as measured by electron microscopy, was at most about 10 nm. The specific surface area, measured according to the BET method, was about 120 $m^2/g$. The average particle size, calculated from surface area was 7.2 nm. The particle size, measured according to the dynamic light-scattering using a U.S. Coulter's $N_4$ device was 10.7 nm.

1200 g of the pale yellow, transparent aqueous sol of stannic dioxide was dispersed in 10,800 g of water, to which was added 4.8 g of isopropylamine. Then, the resulting mixture was passed through a column filled with an OH-type anion-exchange resin to obtain 13440 g of an alkaline aqueous sol of stannic oxide. The alkaline aqueous sol had a specific gravity of about 1.029, the pH was about 9.80, and the viscosity was about 1.4 mPa·s. The $SnO_2$ content was about 2.95% by weight, and the isopropylamine content was about 0.036% by weight.

Zirconium oxychloride ($ZrOCl_2.8H_2O$) was dissolved in water to prepare an aqueous zirconium oxychloride solution with a concentration of 2.0% by weight in terms of $ZrO_2$. 10,791 g of the aqueous alkaline sol of stannic oxide (containing 409.5 g of $SnO_2$) was added to, 3043 g of the aqueous zirconium oxychloride solution and the mixed sols stirred at room temperature, for about 2 hours. The sol mixture had a ratio by weight of $ZrO_2/SnO_2$ of 0.15 and a pH of 1.50.

The sol mixture was heated to a temperature of about 90° C. for 5 hours with stirring to obtain 13,834 g of a stannic oxide-zirconium oxide aqueous sol composite. The sol contained 2.96% by weight of $SnO_2$, 0.44% by weight of $ZrO_2$, and its pH was about 1.45. The particle size was about 9.0 nm.

113 g of No. 3 diatom (containing 29.0% by weight of $SiO_2$) was added to 2353.7 g of water, and then 33.3 g of sodium tungstate, $Na_2WO_4.2H_2O$ (containing 71% by weight of $WO_3$) and 42.45 g of sodium stannate, $NaSnO_3.H_2O$ (containing 55% by weight of $SnO_2$) were added. This mixture was passed through an H-type cation-exchange resin column to obtain 3150 g of an acidic sol of tungsten oxide-stannic oxide-silicon dioxide composite. The pH of the sol was about 2.1; its $WO_3$ content was about 0.75% by weight; its $SnO_2$ content was about 0.75% by weight, and the $SiO_2$ content was about 1.00% by weight. The ratio by weight of $WO_3/SnO_2$ was about 1.0. The ratio by weight of $SiO_2/SnO_2$ was about 1.33. The particle size was about 2.5 nm.

3150 g of the tungsten oxide-stannic oxide-silicon dioxide composite sol, containing 78.83 g in total of $WO_3+SnO_2+SiO_2$ was stirred at room temperature. 11592.6 g of the stannic oxide-zirconium oxide composite sol, containing 394.1 g in total of $ZrO_2+SnO_2$, was added to the $WO_3/SnO_2/SiO_2$ sol over a period of 20 minutes. The combined sol was then stirred for an additional 30 minutes. The ratio by weight of tungsten oxide-stannic oxide-silicon dioxide composite colloid ($WO_3+SnO_2+SiO_2$) to stannic oxide-zirconium oxide composite colloid ($ZrO_2+SnO2$), ($WO_3+SnO_2+SiO_2$)/($ZrO_2+SnO_2$) was about 0.20, the pH was about 2.26, and the overall metal oxide content was about 3.2% by weight. The mixture appeared slightly cloudy as the ocolloidal particles are believed to be micro-aggregated.

9.5 g of diisobutylamine was added to 14742.6 g of the combined $WO_2/SnO_2/SiO_2/ZrO_2$ sol. This mixture was passed through a column filled with an OH-type anion-exchange resin (Amberlite 410) at room temperature, and then aged under heat at about 80° C. for about 1 hour to obtain 16288 g of an aqueous sol of modified stannic oxide-zirconium oxide composite (dilute liquid). The overall metal oxide content of the sol was 2.90% by weight, and the pH was about 10.4.

The aqueous sol composite (dilute liquid) was concentrated by filtering it through an ultrafilter (fractionation molecular weight: 50,000) at room temperature to obtain 2182 g of a concentrated aqueous sol. The sol had a pH of about 8.71, and an overall metal oxide content ($ZrO_2+SnO_2+WO_3+SiO_2$) of 18.3% by weight.

4.0 g of tartaric acid, 6.0 g of diisobutylamine and one drop of a defoaming agent (SN Defoamer 483 made by San Nopco Limited) were added to the concentrated aqueous sol stirred at room temperature, for about 1 hour. The resulting sol was put into a flask equipped with a stirrer, and water was removed by evaporation under ambient pressure, as about 20 liters of methanol were added. Thus, a portion of the water in the sol was substituted for methanol. 1171 g of a methanol sol with a specific gravity at about 1.124, a pH of about 7.45; and a about viscosity 2.3 mPa·s. The overall metal oxide content ($ZrO_2+SnO_2+WO_3+SiO_2$) was about 32.7% by weight, and the water content was about 0.47% by weight. The particle size measured by electron microscopy, was from about 10 nm to about 15 nm.

After storage of this sol at room temperature for 3 months, the sol contained little if any forming deposits and did not become apparently cloudy or thick. The dried product of the sol had a refractive index of 1.76.

2. Preparation of Coating Composition 15 parts by weight of γ-glycidoxypropyltrimethoxysilane and 49 parts by weight of the methanol sol as prepared above were mixed at 15° C., and stirred for 1 hour. 3.5 acidified parts by weight of 0.001 N hydrochloric acid were added, and the mixture stirred for 50 hours.

30 parts by weight of propylene glycol monomethyl ether (PGM), 0.6 parts by weight of aluminum trisacetylacetonate (AL-AA), and 0.01 part by weight of diisobutylamine were added to the acidified mixture in that order and stirred for 80 hours. The resulting solution was filtered through a 0.5 μm filter to give a coating composition of the invention.

3. Pre-treatment of Lens

A lens (EYAS® having a refractive index of 1.60, made by Hoya Corporation) was dipped in an aqueous sodium hydroxide solution at 60° C. for 180 seconds in an ultrasonic unit at 28 kHz. The lens was then washed with ion-exchanged water for 180 seconds in an ultrasonic unit resonating at 28 kHz and containing ion exchanged water. The lens was removed from the ultrasonic unit and dried at 70° C. to give a pre-treated lens.

4. Formation of Cured Coating Composition

The pre-treated lens was dipped in the coating composition for 30 seconds, and then pulled up at a rate of 30 cm/min. The resin composition on the lens was cured at 120° C. for 60 minutes to form a coated lens.

Example 2

A coating composition was prepared in the same manner as in Example 1, except that i-propylamine was used instead of diisobutylamine. A coated lens was prepared as in Example 1.

Example 3

A coating composition was prepared in the same manner as in Example 1, except that γ-methacryloyloxypropyltrimethoxysilane was used herein in place of γ-glycidoxypropyltrimethoxysilane. A coated lens was prepared as in Example 1.

Example 4

A coating composition was prepared in the same manner as in Example 1, except that γ-methacryloyloxypropyltrimethoxysilane was used instead of γ-glycidoxypropyltrimethoxysilane and i-propylamine was used instead of diisobutylamine. A coated lens was prepared as in Example 1.

Example 5

A coating composition prepared in the same manner as in Example 1 was applied onto a lens of diethylene glycol bisallyl carbonate, and processed in the same manner as in Example 1, to form a coated lens.

Example 6

A coating composition was prepared in the same manner as in Example 1, except that a dispersion of stannic oxide-tungsten oxide-zirconium oxide composite colloid particles in methanol, which is described in Japanese Patent Laid-Open No. 25603/1994, was used instead of the sol used in Example 1. A coated lens was prepared as in Example 1.

Comparative Example 1

A coating composition was prepared in the same manner as in Example 1, except that diisobutylamine was not used. A coated lens was prepared as in Example 1.

Comparative Example 2

A coating composition was prepared in the same manner as in Example 3, except that diisobutylamine was not used. A coated lens was prepared as in Example 1.

Comparative Example 3

A coating composition was prepared in the same manner as in Example 5, except that diisobutylamine was not used. A coated lens was prepared as in Example 1.

Comparative Example 4

A coating composition was prepared in the same manner as in Example 6, except that diisobutylamine was not used. A coated lens was prepared as in Example 1.

Comparative Example 5

A coating composition was prepared in the same manner as in Example 1, except that the curing agent AL-AA was not used. A coated lens was prepared as in Example 1.

Comparative Example 6

A coating composition was prepared in the same manner as in Example 1, except that 0.01 part by weight of diisobutylamine was added to γ-glycidoxypropyltrimethoxysilane and thereafter the methanol sol was added thereto. A coated lens was prepared as in Example 1.

Comparative Example 7

A coating composition was prepared in the same manner as in Example 1, except that diisobutylamine was added to γ-glycidoxypropyltrimethoxysilane, then the methanol sol was added thereto. The resulting mixture was then hydrolyzed in the presence of hydrochloric acid. A coated lens was prepared as in Example 1.

Comparative Example 8

A coating composition was prepared in the same manner as in Example 1, except that 0.01 part by weight of diisobutylamine was added to the methanol sol. A coated lens was prepared as in Example 1.

Method for Evaluation of Storage Stability

The storage stability of the coating compositions is believed to have an effect of the adhesion between the cured coating and the lens. The stability of the coating compositions was tested by storing the compositions at 30° C., and their storage stability was evaluated on the basis of the adhesive strength between the cured coating and the lens.

The number of days within which a cured coating sustained complete adhesion of 100/100 is the criterion of the storage stability of the coating composition tested (cross-hatch test). The adhesiveness on day 0 (zero) is 100/100.

The cross-hatch test is as follows: A cured coating formed on a lens is cut to have 1.5 mm-wide 100 cross-cuts, and an adhesive tape (Nichiban's Cellotape® is firmly attached to the surface of the coating. Then, the tape is rapidly removed, and the number of the cross-cuts of the cured coating still remaining on the substrate is counted. The coating compositions having sustained complete adhesion of 100/100 for at least 7 days in the test are good (○); those having sustained complete adhesion for at least 3 days but shorter than 7 days are not as good (Δ); and those having sustained complete adhesion for shorter than 3 days are bad (x).

The scratch resistance of cured coatings is evaluated using steel wool. In the test, the coating compositions having maintained the initial hardness of their cured coatings for at least 7 days are good (○○); those having maintained initial hardness for at least 3 days but shorter than 7 days are average (○); and those having maintained initial hardness for shorter than 3 days are bad (x). The test results of the prepared coating compositions are given in Table 1.

TABLE 1

| | Adhesiveness | Scratch Resistance | Appearance of Coated Lens |
|---|---|---|---|
| Example 1 | ○ | ○○ | good |
| Example 2 | ○ | ○○ | good |
| Example 3 | ○ | ○○ | good |
| Example 4 | ○ | ○○ | good |
| Example 5 | ○ | ○○ | good |
| Example 6 | ○ | ○ | good |
| Comp. Ex. 1 | X | ○○ | good |
| Comp. Ex. 2 | X | ○○ | good |
| Comp. Ex. 3 | X | ○○ | good |
| Comp. Ex. 4 | X | ○○ | good |
| Comp. Ex. 5 | X | ○○ | good |
| Comp. Ex. 6 | ○ | X | poor transparency |
| Comp. Ex. 7 | X | X | good |
| Comp. Ex. 8 | ○ | ○○ | poor transparency |

As shown in Table 1, the cured coatings of Examples 1 to 6 all sustained complete adhesion of 100/100 for at least 7 days. In contrast, the adhesiveness of the cured films of Comparative Examples 1 to 5 was bad. The adhesion stability of the cured film of Comparative Example 2 was good, but the cured film was cracked since the step of keeping the coating composition at 20° C. was omitted. Cracked coatings are not aesthetically desirable. The storage stability of the coating compositions of Comparative Examples 6 and 8 was good, but the cured coatings were poor in transparency. The storage stability of the coating composition of Comparative Example 7 showed no improvement.

What is claimed is:

1. A coated lens comprising:
   a formed and previously cured lens; and
   a cured coating disposed on a surface of the lens, wherein the cured coating results from curing a coating composition applied to the formed and previously cured lens, the coating composition being produced by the process comprising:
   providing a mixture consisting essentially of metal oxide colloid particles and an organosilicon compound;
   hydrolyzing the mixture; and
   after hydrolyzing the mixture, adding an acetylacetonate metal salt and an aliphatic amine to the hydrolyzed mixture.

2. The coated lens of claim 1, wherein the organosilicon compound is selected from compounds of the general formula (I):

wherein $R^1$ and $R^3$ are independently a hydrocarbon group having from 1 to 10 carbon atoms and optionally having a functional group; $R^2$ is selected from an alkyl group having from 1 to 8 carbon atoms, an aryl group having from 6 to 10 carbon atoms, a alkyl group having from 7 to 10 carbon atoms including an aryl group, an acyl group having from 1 to 8 carbon atoms or the combinations thereof; and a and b are 0 or 1; and $(OR^2)$'s may be the same or different, or compounds of the general formula (II):

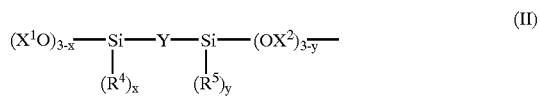

wherein $R^4$ and $R^5$ are a hydrocarbon group having from 1 to 5 carbon atoms; $X^1$ and $X^2$ independently comprise a group selected from an alkyl group having from 1 to 4 carbon atoms, an acyl group having from 1 to 4 carbon atoms, the hydrolyzate products thereof, or the combinations thereof; Y represents a hydrocarbon group having from 1 to 20 carbon atoms; and x and y is 0 or 1.

3. The coated lens of claim 1, wherein the coating composition comprises between 1 and 500 parts by weight of the metal oxide colloid particles, and between 0.001 and 10 parts by weight of the aliphatic amine, relative to 100 parts by weight of the organosilicon compound.

4. The coated lens of claim 1, wherein the metal oxide colloid particles are selected from the group consisting of aluminum oxide, iron oxide, tin oxide, zirconium oxide, silicon oxide, titanium oxide, tungsten oxide, antimony oxide and composite oxides thereof.

5. A method for producing a coated lens, comprising:
   producing a coating composition by providing a mixture consisting essentially of metal oxide colloid particles and an organosilicon compound, hydrolyzing the mixture and adding an acetylacetonate metal salt and an aliphatic amine to the hydrolyzed mixture,
   applying the coating composition to a surface of a formed lens, and
   curing the coating composition.

* * * * *